Nov. 4, 1969    K. FRIESS ET AL    3,476,688
FERROMAGNETIC MANGANESE-MAGNESIUM-ZINC FERRITE-BODY WITH
RECTANGULARLY SHAPED HYSTERESIS LOOP AND PROCESS
FOR ITS MANUFACTURE
Filed Sept. 29, 1966    2 Sheets-Sheet 1

INVENTORS
Klaus Friess
Richard Ulrich
Athanasios Kritikos

By Hill & Hill
ATTYS.

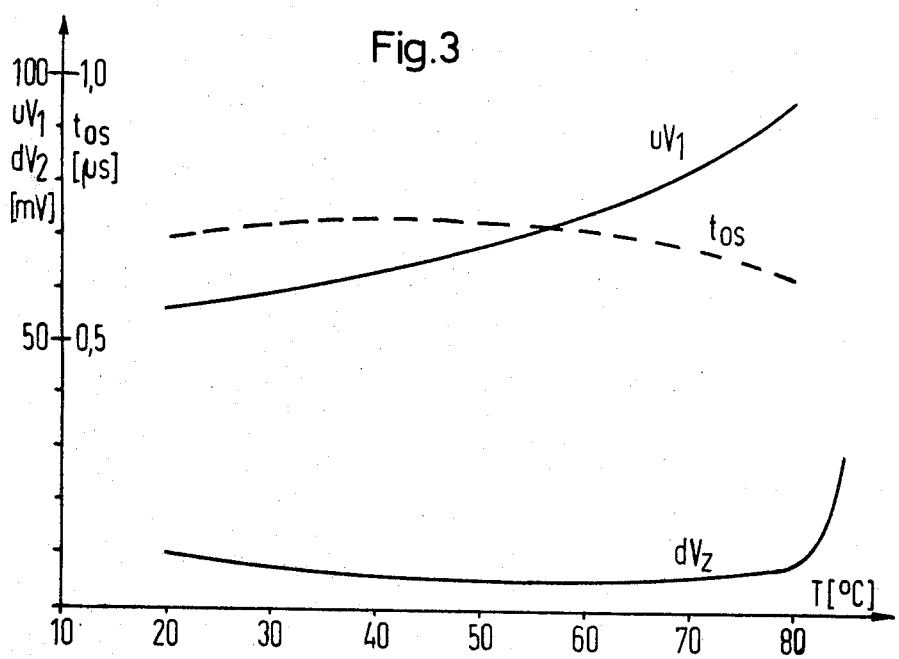
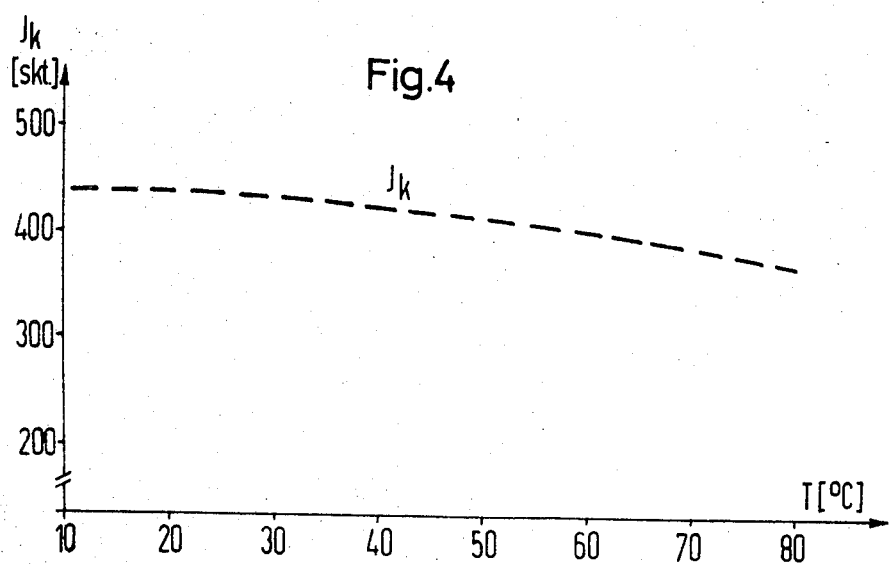

3,476,688
FERROMAGNETIC MANGANESE - MAGNESIUM-ZINC FERRITE-BODY WITH RECTANGULARLY SHAPED HYSTERESIS LOOP AND PROCESS FOR ITS MANUFACTURE
Klaus Friess, Munich, Richard Ulrich, Bad Aibling, and Athanasios Kritikos, Munich, Germany, assignors to Siemens Aktiengesellschaft, Munich, Germany, a corporation of Germany
Filed Sept. 29, 1966, Ser. No. 583,009
Claims priority, application Germany, Sept. 30, 1965, S 99,812
Int. Cl. H01f 1/34; C04b 35/38
U.S. Cl. 252—62.61
11 Claims

ABSTRACT OF THE DISCLOSURE

A ferromagnetic under-stoichiometric manganese-magnesium-zinc ferrite having a rectanguarly shaped hysteresis loop for storage and switching elements over a large operating temperature range of about 10° C. to 60° C. and extremely limited magnetostrictive oscillations. The ferrite is composed of 32.5 to 50 mol percent $Fe_2O_3$, 22 to 32 mol percent MgO, 22 to 25 mol percent MnO, 2 to 4 mol percent ZnO and 0.5 to 5 mol percent of a material selected from the group consisting essentially of $Li_2O$, CaO and mixtures thereof. The process of manufacturing such ferrite is also disclosed.

---

The invention relates to a ferromagnetic manganese-magnesium-zinc-ferrite-body with rectangular shaped hysteresis loop and to a process for its manufacture.

Such ferromagnetic ferrite-bodies with a rectangularly shaped hysteresis loop are particularly suitable for storing and switching purposes.

On the one hand, such so-called rectangular ferrites are known in which the rectangularly shaped hysteresis loop spontaneously forms itself during the manufacture undertaken according to ceramic techniques. For example, manganese-magnesium ferrites which may contain an addition of zinc oxide, may be catalogued with these rectangular ferrites. For example, it is known to mix 14% MgO with 30% $MnO_2$ and 56% red ferric-oxide, calculated by weight, and to fire this mixture in a nitrogen atmosphere at 1250° C. so that a sintered body is produced which exhibits a ratio of the remanent induction to the saturation induction of $B_r/B_s = 0.83$ and a coercive force of $H_c = 2.1 \phi e$. In addition to a number of other rectangular ferrites with different components, there is also known rectangular ferrites containing lithium which include, besides lithium and ferric oxide, chromium oxide or copper oxide. These ferrites are composed as follows:

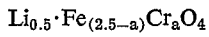

$a = 0.9-1.7$

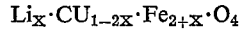

$X = 0.25-0.4$

Such a lithium containing copper ferrite exhibits, for example, a ratio of the remanant induction to the induction at which the hysteresis loop just closes of $B_r/B_{c1} > 0.7$ and a coercive field force of $H_c < 0.4 \phi e$. For the production of such a ferrite body, lithium carbonate and ferric oxide are burned to form a lithium ferrite. In addition thereto, copper oxide is fired with ferric oxide to form a copper ferrite and finally both ferrites are ground, mixed and sintered for the specified lithium copper ferrite. Beyond this, there are also known Mn-Mg rectangular ferrites which include 0–8% heavy metal oxides, or for 27.5–66 mol-percent MnO, an addition of 4–25 mol-percent MO. Also included would be at least 2 mol-percent MgO as well as at least 2 mol-percent oxide of Zn, Cu, Ca and/or Cd. In this regard, preference would be given to the use of 2 to approximately 9.6 mol-percent MgO component. The disadvantage of these spontaneous magnesium-manganese rectangular ferrites resides in the fact that their qualities utilized for storage and switching purposes are relatively strongly temperature-dependent so that these bodies may be used only in a temperature range of approximately 20 to 40° C., possibly between 10 and 40° C., without additional temperature or current regulation. In this range, the extreme values of the respective qualities differ from each other by approximately 10%. The advantage of the spontaneous lithium-containing nickel or copper ferrites resides in the fact that, owing to a relatively high magnetostriction, they give rise to magnetostrictive oscillations during the storage or switching operations and as a result give rise to increased interference voltages. The ratio of effective voltage to interference voltage is therefore relatively small so that when these ferrite bodies are used, storage and switching elements have to be additionally damped.

Besides the so-called spontaneous rectangular ferrite bodies there is also known so-called inducted rectangular ferrite bodies in which the rectangular character of the hysteresis loop occurs only following a temperature treatment in a magnetic field. The induced rectangular ferrite bodies are in particular produced from so-called perminvar ferrites. As a rule, these are over-stoichiometric ferrites containing nickel oxide and cobalt oxide which after sintering are slowly cooled. For the formation of the rectangular character of the hysteresis loop, these cores are tempered at several hundred degrees centigrade in a magnetic field, or immediately after sintering are cooled in a magnetic field. Although these induced rectangular ferrite bodies exhibit a larger operating temperature range than the spontaneous rectangular ferrite bodies of the above described type, they distinguish themselves by a relatively large switching constant so that such ferrite bodies cannot be utilized for calculating operations involving high calculating speeds.

It is the purpose of the invention to eliminate these disadvantages.

According to the invention, ferromagnetic manganese-magnesium-zinc-ferrite bodies with less than 50 mol-percent $Fe_2O_3$, i.e., under-stoichiometric manganese-magnesium ferrite bodies, possesses the following composition:

<50 mol percent $Fe_2O_3$
20–25 mol percent MnO
22–32 mol percent MgO
2–10 mol percent ZnO
1–5 mol percent XO in which composition XO represents $Li_2O$, CaO and mixtures thereof.

In the process acording to the invention, either the initial materials for the ferromagnetic body are mixed with the admixture oxides and pressed and sintered according to ceramic techniques, or manganese-magnesium-zinc ferrite-powder is mixed with the admixture oxides and pressed and sintered according to ceramic techniques. When using lithium carbonate, as an initial material, the lithium carbonate is transformed into lithium oxide and carbon dioxide during the course of the firing process, during which procedure the lithium oxide installs itself into the ferrite lattice.

The addition of calcium and/or titanium oxide is also advantageous.

Surprisingly, even small lithium carbonate additions to the under-stoichiometric magnesium-manganese-zinc ferrites decisively improve their temperature behavior. Just as surprising is the improvement of the temperature behavior when using calcium oxide. If lithium oxide as well as calcium oxide are added, the problem upon which the invention is based is solved in an especially advantageous manner. While the addition of SnO or TiO$_2$ likewise results in an improvement, their influence is, however, less strongly marked.

In the following, the manufacture and qualities of toroidal storage cores from ferrite bodies according to the invention are presented as examples.

FIGURE 3 is a chart illustrating temperature dependent characteristics of a material embodying the invention; and FIGURE 4 is a chart illustrating field strength-temperature relations of such ferrite bodies.

FIG. 1 illustrates an example of a toroidal storage core 1 produced from the ferrites hereinafter specified in Examples 1–3, the outer diameter of which amounts to 1.2 mm. Lines 3a–3c, provided for the execution of the the storage operations, are threaded through the central hole 2.

Figure 1:
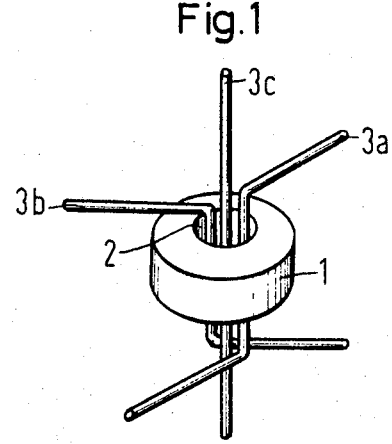
FIGURE 1 illustrates a toroidal storage core as an example of the application of the present invention.
Figure 2:
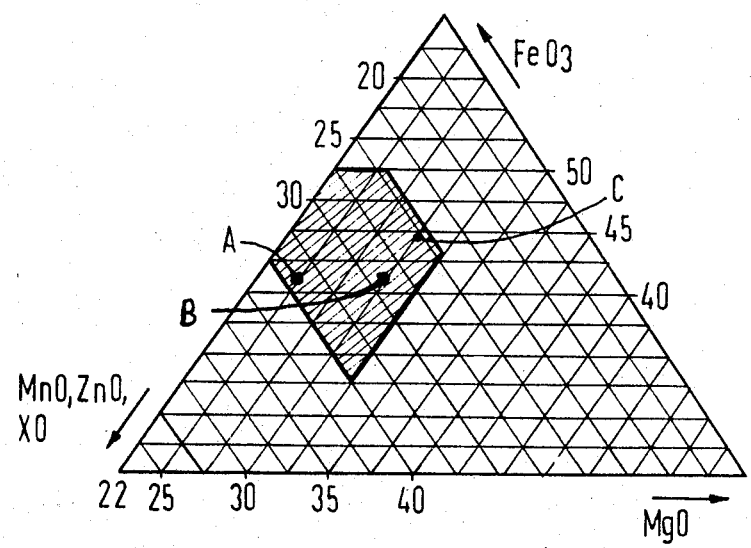
FIGURE 2 is a composition diagram for several examples of the invention.

The composition diagram of FIG. 2 illustrates compositions A–C which correspond to Examples 1–3.

Example 1

A ground ferrite powder of 40.5 mol percent Fe$_2$O$_3$, 26 mol percent MgO, 26 mol percent MnO and 7.5 mol percent ZnO is provided with 2%, by weight, Li$_2$CO$_3$ and 4%, by weight, Fe$_2$O$_3$. The powder is mixed for one hour in alcohol, subsequently dried, mixed with a binding agent and pressed into toroid cores. The cores are heated in a vacuum with a pressure of approximately 0.2 Torr, sintered in air at 1180° C. for four hours and subsequently cooled to room temperature in approximately one-half hour at reduced pressure of 100 Torr air. When the sinter temperature is reached, air is admitted up to normal pressure which is only reduced again during the cooling. The toroidal ferrite cores produced in such a manner according to point A of the diagram of FIG. 2, exhibit, under the measuring conditions of $I_f=750$ ma., $I_t/I_f=0.55$ and $T_r=0.2\mu$sec, the following storage characteristics:

TABLE 1

|  | 25° C. | 60° C. |
|---|---|---|
| $\mu V_1$(mV) | 55–60 | 70–75 |
| $dV_z$(mV) | 7–8 | 5–6 |
| $t_{os}(\mu sec)$ | Appr. 0.7 | Appr. 0.7 |
| $\mu V_1/dV_z$ | 7.5 | 12.5 |

In FIGURE 3, the dependence of the characteristic values upon the temperature T is represented. The interference voltage $dV_z$, in the temperature interval of 20 to 80° C., remains practically constant and only begins to increase strongly above 80° C. The effective voltage $uV_1$ increases gradually with the temperature. The switching time $t_{os}$ only deviates insignificantly from the average value of 0.7 $\mu$sec in the temperature range between 20 and 80° C., with such deviation amounting to less than ±10%. The interference signals caused by magnetostrictive oscillations, which occur with regard to the customary lithium ferrites or over-stoichiometric nickel-magnesium-zinc ferrites, are by a factor 2–5 lower than for those rectangular ferrites.

In the utilization of such ferrite bodies in coincidence storers, the dependence, upon temperature, of the knee or transition field strength $I_k$ of the rectangular loop, is important. Therefore, in FIG. 4 the dependence of the knee current, in scale units upon the temperature is illustrated. The dependence of this knee current upon the temperature is relatively insignificant so that the ferrite body according to the invention is able to compete, with respect to temperature characteristics, with the heretofore known wide temperature rectangular ferrites without disadvantage.

Approximately the same qualities are obtained when lithium carbonate is mixed in during the weighing of the individual components, as a rule existing in the form of oxides. In this case, the material composition is approximately 40.5 mol percent Fe$_2$O$_3$, 25 mol percent MgO, 25 mol percent MnO, 7.5 mol percent ZnO and 2 mol percent Li$_2$O (admixed as lithium carbonate).

Example 2

A mixture of 41 mol percent Fe$_2$O$_3$, 31 mol percent MgO, 20 mol percent MnO, 5 mol percent ZnO and 3 mol percent CaO is mixed for two hours with alcohol and, after drying, pre-sintered for 15 hours at 920° C. Subsequently the pre-sintered product is finely ground in alcohol for eight hours. The powder, granulated with a binding agent is pressed in known manner, into toroidal cores of 1.2 mm. in diameter and these cores are, after the expulsion of the binding agent, sintered in an inert gas, for example nitrogen, for approximately one hour at 1200° C. and quickly cooled. In this case, because of the CaO-addition a vacuum treatment such as performed in Example 1 is not necessary.

The following values were measured at the cores produced in this manner at a maximum current $I_f=550$ ma., a partial current ratio $I_o/I_f=0.55$, and and an impulse rise time of $T_r=0.2\mu$s:

TABLE 2

|  | 25° C. | 60° C. |
|---|---|---|
| Effective voltage $uV_1$(mV) | 55–65 | 82–92 |
| Interference voltage $dV_z$(mV) | 6–7 | 6.5–7.5 |
| Switching Time $t_{os}(\mu s_z)$ | 0.8–0.9 | 0.6–0.7 |
| $uV_1/dV_z$ | 8.5 | 12.2 |

An additional advantage of the calcium oxide addition resides in the already known reduction of the required sintering temperature.

Example 3

Especially advantageous is the joint use of additions of calcium oxide and lithium oxide, as a result of which, not only is the sintering process simplified, but above all the temperature constancy is improved. Following sintering and cooling, cores of the following composition: 43 mol percent Fe$_2$O$_3$, 30 mol percent MgO, 20 mol percent Mno, 4 mol percent ZnO, 2 mol percent CaO and 1 mol percent Li$_2$O exhibit, under the customary conditions, the following average values at $I_f=550$ ma.; $I_p/I_f=0.55$; $T_r=0.2$ $\mu$s.

TABLE 3

|  | 25° C. | 60° C |
|---|---|---|
| Effective voltage $uV_1$(mV) | 59 | 85 |
| Interference voltage $dV_z$(mV) | 7.5 | 7.2 |
| Switching time $t_{os}$(mV) | 0.88 | 0.7 |
| $uV_1/dV_z$ | 7.9 | 11.7 |

Storage devices equipped with such cores can be used in a temperature range of +5° to +60° C. and, with respect to temperature-dependent current regulation, can be employed with temperatures of −5° C. to above 70° C. without additional compensating elements. Additionally, interference voltage through magnetostrictive oscillations are so insignificant that a damping of the cores, which was up to now undertaken by an embedding or packing, is not required.

We claim:

1. A ferromagnetic under-stoichiometric manganese-magnesium-zinc ferrite having a rectangularly shaped hysteresis loop for storage and switching elements over a large operating temperature range of about 10° C. to about 60° C. consisting essentially of 32.5 to 50 mol percent of F$_2$O$_3$, 22 to 32 mol percent of MgO, 22 to 25 mol percent of MnO, 2 to 40 mol percent of ZnO and 0.5 to 5 mol percent of a material selected from the group consisting essentially of Li$_2$O, CaO and mixtures thereof.

2. The ferromagnetic ferrite as defined in claim 1 wherein the ZnO is present in amounts of 4 to 8 mol percent and the $Li_3O$ is present in amounts of 2 to 3 mol percent.

3. A ferromagnetic under-stoichiometric manganese-magnesium-zinc ferrite having a rectangularly shaped hysteresis loop for storage and switching elements over a large operating temperature range of about 10° C. to about 60° C. consisting essentially of 32.5 to 50 mol percent of $Fe_2O_3$, 22 to 32 mol percent of MgO, 22 to 25 mol percent of MnO, 2 to 40 mol percent of ZnO and 0.5 to 5 mol percent of $Li_2O$.

4. A ferromagnetic under-stoichiometric manganese-magnesium-zinc ferrite having a rectangularly shaped hysteresis loop for storage and switching elements over a large operating temperature range of about 10° C. to about 60° C. consisting essentially of 32.5 mol percent to 50 mol percent of $Fe_2O_3$, 22 to 32 mol percent of MgO, 22 to 25 mol percent of MnO, 2 to 40 mol percent of ZnO and 0.5 to 5 mol percent of CaO.

5. A ferromagnetic under-stoichiometric manganese-magnesium-zinc ferrite having a rectangularly shaped hysteresis loop for storage and switching elements over a large operating temperature range of about 10° C. to about 60° C. consisting essentially of 32.5 mol percent to 50 mol percent of $Fe_2O_3$, 22 to 32 mol percent of MgO, 22 to 25 mol percent of MnO, 4 to 8 mol percent of ZnO, 2 to 3 mol percent of $Li_2O$ and 0.5 to 5 mol percent of CaO.

6. A ferromagnetic under-stoichiometric manganese-magnesium-zinc ferrite having a rectangularly shaped hysteresis loop for storage and switching elements over a large operating temperature range of about 10° C. to about 60° C. consisting essentially of about 40.5 mol percent of $Fe_2O_3$, about 25 mol percent of MgO, about 25 mol percent of MnO, about 7.5 mol percent of ZnO and about 2 mol percent of $Li_2O$.

7. A ferromagnetic under-stoichiometric manganese-magnesium-zinc ferrite having a rectangularly shaped hysteresis loop for storage and switching elements over a large operating temperature range of about 10° C. to about 60° C. consisting essentially of about 43 mol percent of $Fe_2O_3$, about 30 mol percent of MgO, about 20 mol percent of MnO, about 4 mol percent of ZnO, about 2 mol percent of CaO and about 1 mol percent of $Li_2O$.

8. A ferromagnetic under-stoichiometric manganese-magnesium-zinc ferrite having a rectangularly shaped hysteresis loop for storage and switching elements over a large operating temperature range of about 10° C. to about 60° C. consisting essentially of about 41 mol percent of $Fe_2O_3$, about 31 mol percent of MgO, about 20 mol percent of MnO, about 5 mol percent of ZnO and about 3 mol percent of CaO.

9. A process of manufacturing a ferromagnetic under-stoichiometric manganese-magnesium-zinc ferrite having a rectangularly shaped hysteresis loop for storage and switching elements over a large operating temperature range of about 10° C. to 60° C. consisting essentially of (1) providing a mixture consisting essentially of 32.5 to 50 mol percent of $Fe_2O_3$, 22 to 32 mol percent of MgO, 22 to 25 mol percent of MnO, 2 to 40 mol percent of ZnO and 0.5 to 5 mol percent of a material selected from the group consisting essentially of $Li_2O$, CaO and mixtures thereof; (2) blending said mixture into a substantially uniform mass; (3) pressing said mass into a ferrite core shape; and (4) sintering the pressed shape in accordance with ceramic techniques.

10. A process of manufacturing a ferromagnetic under-stoichiometric manganese-magnesium-zinc ferrite having a rectangularly shaped hysteresis loop for storage and switching elements over a large operating temperature range of about 10° C. to 60° C. consisting essentially of (1) providing a mixture consisting essentially of 32.5 to 50 mol percent of $Fe_2O_3$, 22 to 32 mol percent of MgO, 22 to 25 mol percent of MnO, 2 to 40 mol percent of ZnO and 0.5 to 5% by weight of $Li_2CO_3$; (2) blending said mixture into a substantially uniform mass; (3) pressing said mass into a ferrite core shape; (4a) heating said pressed shape under reduced pressure conditions; (4b) sintering said heated shape at temperatures above about 1,000° C. in ambient atmosphere and (4c) cooling said sintered shape under reduced pressure conditions.

11. A process of manufacturing a ferromagnetic under-stoichiometric manganese-magnesium-zinc ferrite having a rectangularly shaped hysteresis loop for storage and switching elements over a large operating temperature range of about 10° C. to 60° C. consisting essentially of (1) providing a mixture consisting essentially of 32.5 to 50 mol percent $Fe_2O_3$, 22 to 32 mol percent of MgO, 22 to 25 mol percent of MnO, 2 to 40 mol percent of ZnO and 0.5 to 5 mol percent of CaO; (2) blending said mixture into a substantially uniform mass; (3a) pre-sintering said mass at a temperature of about 900° C., (3b) pressing said mass into a ferrite core shape; (4a) sintering said pressed core shape at temperatures above about 1,000° C. in ambient atmosphere and (4b) quenching said sintered cores at ambient temperatures.

References Cited

UNITED STATES PATENTS

| | | | |
|---|---|---|---|
| 3,042,619 | 7/1962 | Brownlow et al. | 252—62.64 |
| 3,106,534 | 10/1963 | Akashi et al. | 252—62.59 |
| 3,177,145 | 4/1965 | Brownlow | 252—62.59 |

FOREIGN PATENTS 976,406  8/1963  Germany.

TOBIAS E. LEVOW, Primary Examiner

R. D. EDMONDS, Assistant Examiner

U.S. Cl. X.R.

252—62.62, 62.63, 62.64

UNITED STATES PATENT OFFICE

CERTIFICATE OF CORRECTION

Patent No. 3,476,688　　　　　　　　　　　November 4, 1969

Klaus Friess et al.

It is certified that error appears in the above identified patent and that said Letters Patent are hereby corrected as shown below:

Column 1, line 31, "rectangular" should read -- rectangula --; line 49, "$H_c=2.1\phi e$" should read -- $H_c=2.1$ Oe --; line 62, "$H_c<0.4 Oe$" should read -- $H_c<0.4$ Oe --. Column 2, line 11, "advantage" should read -- disadvantage --. Column 3, line 20, cancel "the", second occurrence. Column 4, line 25, "Io" should read -- Ip --; line 63, "voltage" should read -- voltages --. Column 5, line 3, "$Li_3o$" should read -- $Li_2o$ --.

Signed and sealed this 25th day of August 1970.

(SEAL)
Attest:

Edward M. Fletcher, Jr.　　　　　　　　　　WILLIAM E. SCHUYLER, JR.

Attesting Officer　　　　　　　　　　　　　　Commissioner of Patents